United States Patent
Stiesdal

(10) Patent No.: US 8,506,247 B2
(45) Date of Patent: Aug. 13, 2013

(54) ARRANGEMENT AND METHOD TO CONTROL THE YAWING OF A WIND TURBINE

(75) Inventor: Henrik Stiesdal, Odense C (DK)

(73) Assignee: Siemens Aktiengesellschaft, München (DE)

(*) Notice: Subject to any disclaimer, the term of this patent is extended or adjusted under 35 U.S.C. 154(b) by 592 days.

(21) Appl. No.: 12/795,762

(22) Filed: Jun. 8, 2010

(65) Prior Publication Data
US 2010/0329842 A1 Dec. 30, 2010

(30) Foreign Application Priority Data
Jun. 24, 2009 (EP) .................................... 09008270

(51) Int. Cl.
F03D 7/04 (2006.01)
(52) U.S. Cl.
USPC ........ 416/1; 416/9; 416/41; 416/61; 416/93 R
(58) Field of Classification Search
USPC ................ 416/9, 36, 37, 41, 61, 93 R, 1
See application file for complete search history.

(56) References Cited

U.S. PATENT DOCUMENTS

| 4,757,211 A | 7/1988 | Kristensen | |
|---|---|---|---|
| 8,317,471 B2 * | 11/2012 | Axelsson et al. | 416/41 |
| 2007/0086893 A1 * | 4/2007 | Pedersen | 416/61 |
| 2009/0047129 A1 * | 2/2009 | Yoshida | 416/9 |
| 2009/0142192 A1 * | 6/2009 | LeClair et al. | 416/9 |
| 2010/0054941 A1 * | 3/2010 | Hoffmann | 416/61 |

FOREIGN PATENT DOCUMENTS

| DE | 20 2007 006 089 | * | 8/2007 |
|---|---|---|---|
| DE | 202007006089 U1 | | 8/2007 |
| EP | 2017468 A1 | | 1/2009 |
| EP | 2048507 A2 | | 4/2009 |
| WO | WO 2005/093435 A1 | | 10/2005 |
| WO | WO 2008/129112 A1 | | 10/2008 |

* cited by examiner

*Primary Examiner* — Edward Look
*Assistant Examiner* — William Grigos

(57) ABSTRACT

A wind turbine and a method of controlling yawing of a wind turbine are provided. A nacelle is mounted rotatable around a first axis by an adjustable yaw angle and a hub is mounted rotatable around a rotational axis. The hub includes a blade rotating around the rotational axis, the blade defining a rotor plane perpendicular to the rotational axis. A channel of the wind turbine has an opening, the opening being located at a predefined distance to the rotor plane. At least one component of incoming wind is guided through the opening and into the channel as air flow. A measuring device is provided for measuring the air flow, the measuring device being connected to a controller. The controller detects a yaw angle error between a direction of the incoming wind and the rotational axis, the yaw angle error being used to adjust the yaw angle of the nacelle.

20 Claims, 4 Drawing Sheets

ARRANGEMENT AND METHOD TO CONTROL THE YAWING OF A WIND TURBINE

CROSS REFERENCE TO RELATED APPLICATIONS

This application claims priority of European Patent Office Application No. 09008270.2 EP filed Jun. 24, 2009, which is incorporated by reference herein in its entirety.

FIELD OF INVENTION

The present invention relates to an arrangement and a method to control the yawing of a wind turbine.

SUMMARY OF INVENTION

For wind-turbines a yawing-process is used, to allow the nacelle and its rotating blades to be turned by a certain yaw-angle to achieve an optimum wind-direction in regard to the blades. The blades rotate around a horizontal axis of rotation, which is perpendicular to a plane of rotation, defined by the rotating blades.

There is a so called "yaw angle error", which is the angle between the horizontal axis of rotation and the actual wind direction.

To achieve a maximum capacity of the wind-turbine the axis of rotation of the blades should be parallel to the wind direction. In this case, the yaw angle error shows a value of 0° as the axis is parallel to the wind-direction.

The rotational axis of the rotating blades show also a vertical tilt angle, which is used to prevent the rotating blades touching the tower at high wind speeds. Therefore the rotational axis of the blades is actually slightly off to the parallel orientation—this effect is neglected for the following considerations.

During the yawing-process the nacelle of the wind-turbine is turned around a vertical yaw-axis until the rotational axis of the blades is parallel to the wind direction—except for a possible vertical tilt angle. Usually the yaw-axis is in coincidence with the vertical axis of the tower of the wind-turbine.

The yawing-process is carried out by help of electrical or hydraulic means, normally. A so called "yaw drive unit control" use measurements of the wind-direction. The measurements are done by help of one or more sensors, which are located on top of the nacelle of the wind-turbine normally.

If the wind-direction-sensors are located on the nacelle while the rotating blades are placed in upwind-direction of the tower, the sensors are not exposed in a free manner. Therefore they do not measure the wind-direction without disturbances, which are occurred by the rotating blades.

Instead the wind has passed through the rotating blades and may be distorted due to the passing. There may also be speed-up phenomena around the nacelle itself, while the wind passes through. Such distortion is usually a function of the wind speed, of turbulence, of wind direction and of vertical wind inclination.

Consequently the alignment of the rotational axis of the blades with the wind-direction during the yaw-process is associated with an uncertainty.

At low and medium wind speeds the power output of the turbine is sensitive to a proper yaw-alignment. It is generally believed that on wind-turbines the relationship between the yaw alignment and the power-output is a cosine-square function, rather than a simple cosine function. The reason for this high sensitivity is related to the downwind wake behavior of the wind-turbine.

If the cosine-square relationship is valid, a yaw angle error of 5° would correspond to a power-output of $\cos^2(5°)=0.99$.

This would mean that 1% of the output-power is lost. A loss like this may sound marginal, but it easily runs into more than 100.000 kWh annually for a large wind turbine.

Furthermore, yaw-angle-errors create higher dynamic loading acting on the structure of the wind-turbine, which is an unwanted phenomenon. A great deal of the fatique-load on a turbine relates to yaw-angle-errors.

Up to now the problem of a proper yaw alignment has been solved by a proper calibration of the nacelle-mounted wind-direction-sensors. During a type-testing of the wind-turbine the yaw-alignment is measured by a comparison of the yaw-direction with the wind-direction. The measurement is done at a free-standing meteorological mast. Any offset can be adjusted by a permanent adjustment of mounting-brackets of the wind-direction-sensors. Any dependency to the wind-speed can be adjusted by implementing a suitable correction algorithm in the yaw-drive-unit-controller.

However some difficulties occur in this traditional approach. At first, the traditional method is sensitive to tolerances in the used baseline measurements. They are sensitive to the calibration of the instruments, which are mounted at the free-standing meteorological mast, used to measure the wind-direction. They are sensitive to the calibration of the yaw direction, which is measured at a test turbine and also to the accuracy of the test turbine brackets for the nacelle-mounted wind direction sensors.

Further, the accuracy of yawing will always be a function of the accuracy of the mounting of the sensors on the individual wind-turbines in the field.

Moreover, the flow distortion in the field may be different from the flow distortion in the test-turbine. For instance this results from differences in the nacelle equipment, that may affect speed-up characteristics over the nacelle and may affect differences in ambient flow conditions.

Typically, differences in nacelle equipment may occur because of aerial warning lights. Differences in ambient flow conditions may be, for instance, turbulence or flow inclination, for example due to landscape features at the turbine's location.

It is an object of the invention to provide an improved arrangement and method to control the yawing of a wind-turbine.

These objects are achieved by an arrangement and a method as claimed in the independent claims. Improved embodiments of the invention are object of the dependant claims.

A wind-turbine shows a nacelle and a hub. The nacelle is mounted rotatable around a first axis by an adjustable yaw-angle. The hub is connected with the nacelle and the hub is mounted rotatable around a rotational axis.

In a preferred embodiment the rotational axis is inclined by a certain angle to the first axis, while the inclination is in the range of 90°.

The hub carries at least one blade, which rotates around the rotational axis due to an incoming wind. The rotating blade defines a rotor-plane, which is perpendicular to the rotational-axis. The wind-turbine comprises a channel with at least one opening, while the opening is located at a predefined distance to the rotor-plane.

The opening is arranged in a way, that at least one component of the incoming wind is guided as an air-flow through the opening and into the channel.

The channel comprises a measuring-device, which is arranged to measure a parameter of the air-flow through the channel. The measuring-device is connected with a controller, which is arranged to use the measured parameter of the air-flow to detect an yaw-angle-error between the direction of the incoming wind and the rotational axis, while the yaw-angle-error is used to adjust the yaw-angle of the nacelle.

In a preferred embodiment the wind is guided as an air-flow through the opening and into the channel before the incoming wind passes the rotor-plane.

The ambient, incoming wind show a horizontal component in the rotor-plane if the direction of the incoming wind and the rotational axis of the rotating blade are not parallel to each other. This is the case when a yaw angle error occurs. The horizontal component is the component which has to be measured within the channel to vary the yaw-angle.

The horizontal component of the incoming wind or at least a part of it enters the channel through the opening of the channel in a cyclic manner, if a yaw-angle-error exists. This leads to a cyclic air-flow within the channel, which is measured according to the invention.

This results in a measured periodic variation of the air-flow, which is a function of the yaw-angle-error and consequently this is used for a yaw-control purpose.

The direction of the yawing, in which the rotational axis has to be adjusted, is the one where the periodic variation over time can be reduced. The direction is determined from the phase of the variation with respect to the azimuth of the rotor-plane. If the ambient incoming wind direction and the rotational-axis are parallel to each other the periodic variation of the flow of air in the channel during a rotation period of the rotor is reduced to a minimum value seen over time, or is even reduced to "0".

This means that the rotational-axis is turned by help of the yaw-angle until the periodic variation of the measurement reaches a minimum value or even vanishes. The nacelle may then be held in this position until the periodic variation increases again.

If there is an increase of the variation, the rotor-plane or the nacelle is turned again, until the variation becomes minimal or vanishes.

The yawing of the wind turbine is advantageously performed based on a periodic variation of the measurements from the measurement device during a rotation period of the rotor.

The inventive arrangement provides a very simple and precise method for the yaw control.

The inventive method is insensitive to a flow distortion and measures the yaw-angle-error where it matters—that is in the rotor-plane area.

The advantage of the inventive method for yaw control is that it maximizes the energy output, while the dynamic loading on the wind turbine structure is turned to a minimum. Therefore the lifetime of the wind turbine components is extended.

In a preferred embodiment the channel is extending in a radial manner in an outward-direction from the rotor-axis in a way, that the longitudinal-axis of the channel is substantially parallel to a longitudinal-axis of a rotor blade. This way, the channel can be located at a rotor blade. The opening of the channel is located at a particular distance from the rotor-axis. This way, it is possible to control the yawing of the turbine based on measurements in the rotor-plane at a certain distance from the rotor-axis. It is within the scope of the invention that the channel is an integrated part of a rotor blade.

In a preferred embodiment of the invention the measuring-device is arranged for measuring the air-flow and/or the speed of air in the channel.

In a preferred embodiment of the invention the air-flow is measured by an ultrasonic transducer.

The air-flow and/or the speed of air in the channel will change during a rotation period of the rotor and by comparing the variations with the position of the rotor it is possible to determine the direction in which the wind turbine should be yawed to reduce the yaw-angle-error. This way, it is also possible to use the time varying measurement of the air-flow or the air-speed in the channel to estimate the yaw-angle-error and to control the yawing of the nacelle of the wind turbine.

In a preferred embodiment the channel is arranged in the hub where the channel passes through the hub in a way, that the openings are arranged in the hub in opposition of each other. They are located substantially perpendicular to the rotor axis. This way, the measurement is carried out in front of the rotor which means that the measurement is carried out with no or only a minimum of disturbances from the rotating blades.

This is a great improvement compared to the prior art systems, described in the introduction, as the wind direction is measured without influences and disturbances from the rotating blades of the rotor.

Furthermore, the measuring-device is located and protected inside the channel in a lee-side of the direct weather impact. This is a great improvement compared to anemometers and vanes that are located on the top of the nacelle and thereby are a target of direct wind, sun, rain and snow.

Due to the invention it is possible to choose the diameter or the cross-section of the channel and its openings in a way, that they are big enough (in a range of 40 mm for example) to avoid a deposition of salt, dirt or snow inside the channel.

Ice-accumulation at the openings of the channel and inside the channel is also avoided by an adequate cross-section.

In a further embodiment a propeller or a runner, which is rotating when air passes through, is used as part of the measuring device. The rotation-axis of this propeller is perpendicular to the longitudinal-axis of the channel. In case of a yaw-error the air-flow in the channel spins the runner to rotate in a certain direction. The propeller spins in an alternating manner due to the rotation of the rotor.

In another embodiment the measuring-device is arranged for measuring the periodic differences of the air pressure in the channel. This way, the variations of the air pressure inside the channel during a rotation of the rotating blade is used to estimate the yaw-angle-error for the yaw-control of the nacelle.

The measuring-device is arranged to detect the direction of the air-flow in the channel. This can be achieved by a valve, which is arranged in the channel. An encoder is used to read out the position of the valve. The valve is opened and/or closed in a cyclic manner by the flow of air in the channel. It is hereby possible to detect the direction of the flow of air in the channel by reading out the position of the valve and subsequently to determine the yaw-angle-error by comparing the measurement with the position of the rotor.

In a preferred embodiment the direction of the air-flow is compared with the position of the rotating-blade to estimate the direction of the ambient incoming wind relatively to the rotor plane. This way, it is possible to use the detection of the air-flow-direction in the channel to control the yawing and even the pitch angles of the blades of the wind-turbine.

The mechanical resistance of the valve is changed in a preferred embodiment to avoid an excessive opening and closing of the valve. So an excessive control action of the wind turbine is prevented.

In a preferred embodiment the opening of the channel is inclined between 0° and 90° relative to the rotor-plane to catch the wind-component, which is not perpendicular to the rotor plane. For instance the channel is bended a bit at the end in order to catch the wind coming from the side of the rotor. This way, the opening is arranged to increase the periodic variations of the measurements in case of a yaw angle error.

The flow of air would be increased in one rotor position where the opening is towards the wind and decreased in the opposite position where the opening is positioned away from the wind. The periodic variation of the component of the wind speed in the rotor plane during a rotation period of the rotor is minimal or vanishes when the ambient wind direction and the rotor axis are substantially parallel to each other due to the fact, that the same amount of wind is entering the channel independent of the rotor position.

However, in case of a yaw angle error the measurement alternates due to the rotation of the rotor. In an embodiment of the invention the time varying measurement from the measuring-device is evaluated in time by integration or similar.

It is hereby possible to determine the yaw angle error and/or to control the yawing of the wind-turbine by the offset of the measurements, the amplitude, the root-mean-square-value or the like. For instance an integrated value is more or less "0" when the rotor-plane is aligned substantially perpendicular to the ambient wind-direction. This value indicates that there is no need to change the yawing of the nacelle.

The inventive arrangement is very simple in its construction and therefore allows accurate measurements even in harsh environmental conditions.

In an improved embodiment each blade of the wind-turbine is allocated to one channel, so for three blades a number of three channels are used, while each channel is used to measure the wind-direction inside.

BRIEF DESCRIPTION OF THE DRAWINGS

The invention is described in more detail by the following drawings.

DETAILED DESCRIPTION OF INVENTION

Figure 1:
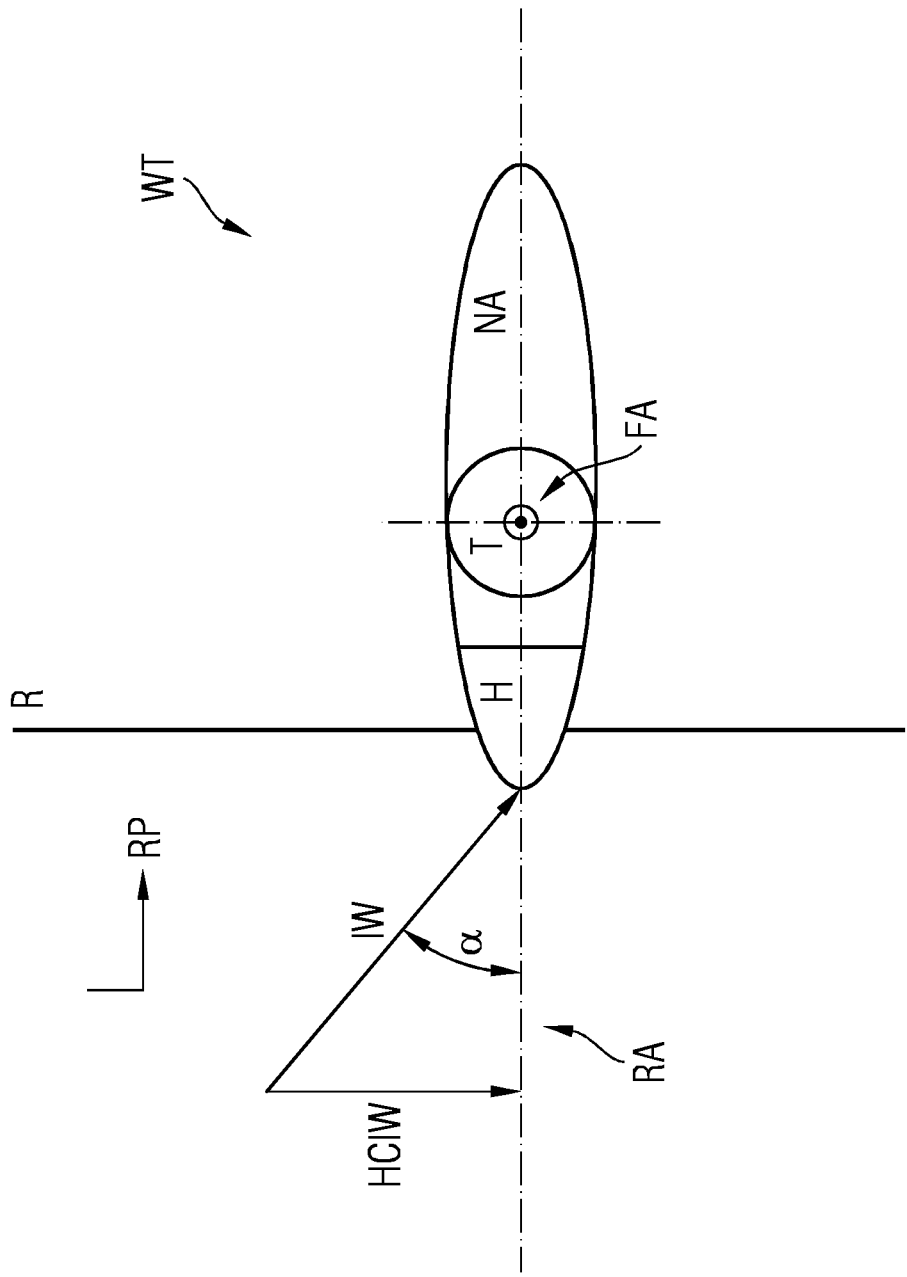
FIG. 1 shows schematically the relation between the yaw-angle-error, the direction of the incoming wind and the direction of the horizontal component of the incoming wind in relation to the wind-turbine.

FIG. 1 shows in a top-view schematically the relation between the yaw-angle-error $\alpha$, the direction of the incoming wind IW and the direction of the horizontal component HCIW of the incoming wind in relation to a wind-turbine WT, which comprises a nacelle NA, a hub H and rotor R with blades. The nacelle NA can be turned by a certain yaw-angle around a so called first axis FA, which is the vertical axis of the tower T. The rotating blades of the rotor define a rotor-plane RP.

If a yaw-angle-error $\alpha$ occurs the incoming wind IW is not parallel to the rotational axis RA of the rotor R. This results in a loss of output-power and in higher wind-loads acting on the wind-turbine-components. The yaw-angle-error $\alpha$ is reduced by turning the rotational axis RA relatively to the direction of the incoming-wind IW.

Figure 2:
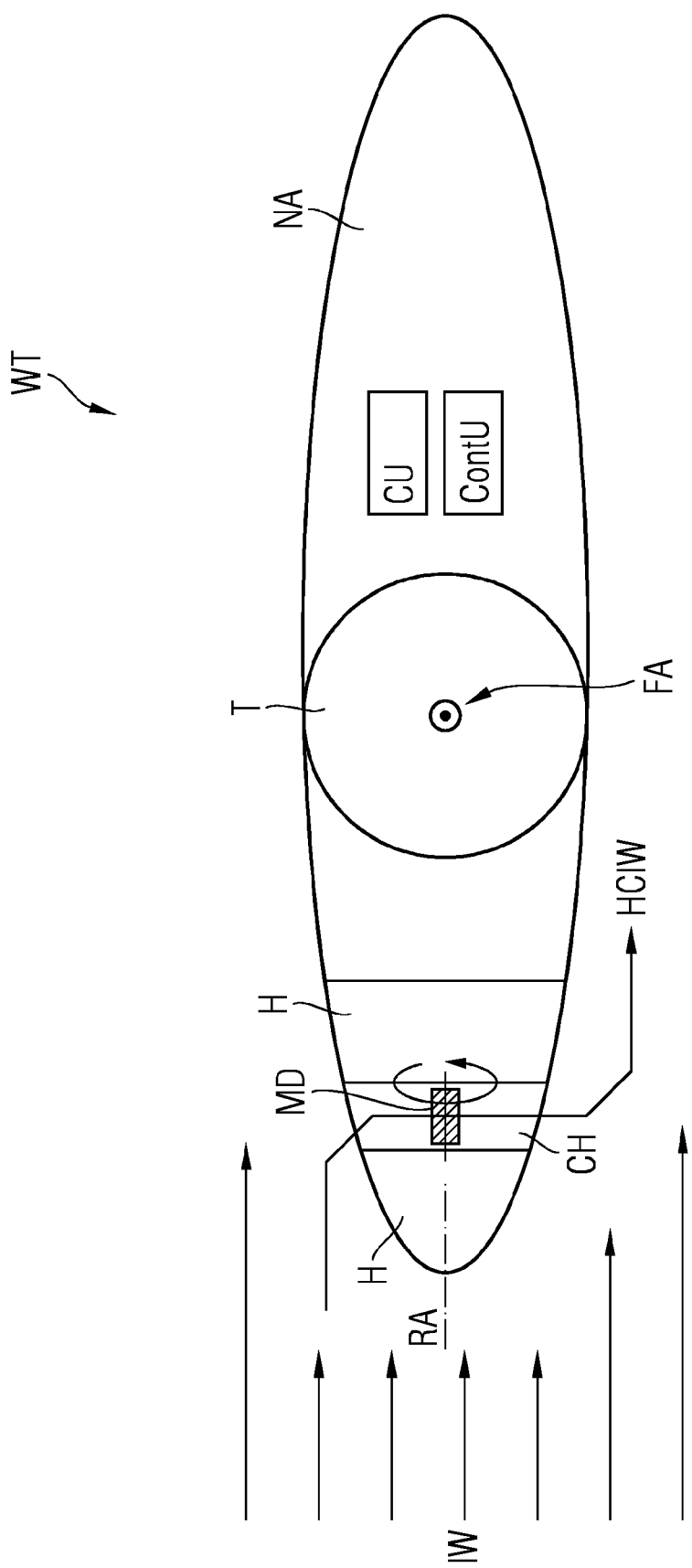
FIG. 2 shows the wind-turbine according to the invention when the yaw-angle-error shows a minimum value.

FIG. 2 shows the wind-turbine WT according to the invention when the yaw-angle-error a shows a minimum value of "0", this means in reference to FIG. 1 that the rotational-axis RA of the rotor R is aligned to the direction of the incoming wind IW.

The nacelle NA of the wind-turbine WT is connected with the hub H, while the hub H is mounted rotatable around the rotational axis RA and carries three blades, not shown here. The nacelle NA is mounted on top of a tower T in a rotatable manner, so it may be rotated around the axis FA of the tower by a certain yaw-angle.

The hub H is saturated by a channel CH. The channel CH comprises a measurement-device MD, which is used to measure the direction of an air-flow passing through the channel CH. The air-flow results from a component HCIW, which is caught by openings of the channel CH from the incoming wind.

As shown here the yaw-angle-error $\alpha$ is nearly "0", so the horizontal component caught by the channel CH equals also nearly "0".

Figure 3:
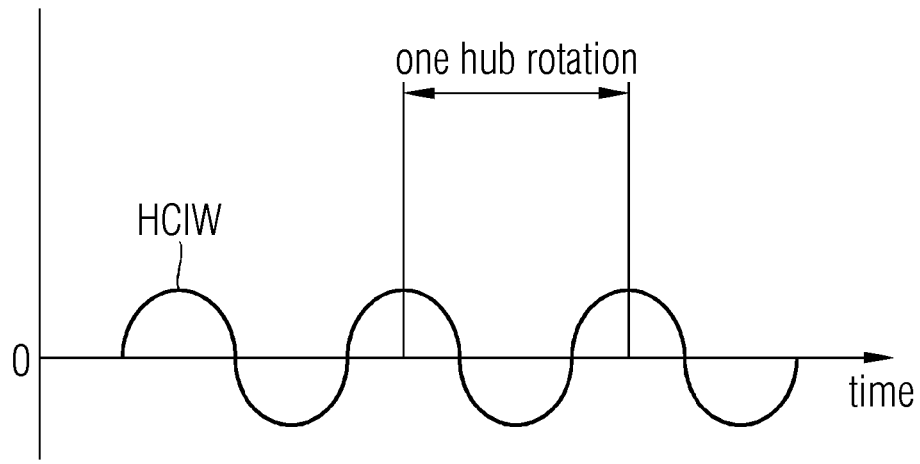
FIG. 3 shows referring to FIG. 2 the measured horizontal component of the wind, which is passing through the channel over time.

The wind-turbine WT comprises a calculation-unit CU, which integrates the measured direction of the air-flow in the channel CH over time as shown in FIG. 3. The calculation-unit CU is connected with a control-unit ContU, which uses the integrated value to control and to align the yaw-angel of the nacelle NA.

FIG. 3 shows referring to FIG. 2 the measured horizontal component HCIW of the air-flow inside the channel CH.

In this case the direction of the air-flow inside the channel CH will alternate between a first direction and a second direction. The alternation will more or less occur in a constant manner, showing nearly constant amplitudes of the alternating directions.

If the time-dependent shape of the measured component HCIW is integrated over time, a value nearly "0" is the result. So the yaw-angle-error $\alpha$ equals also a value of "0".

Figure 4:
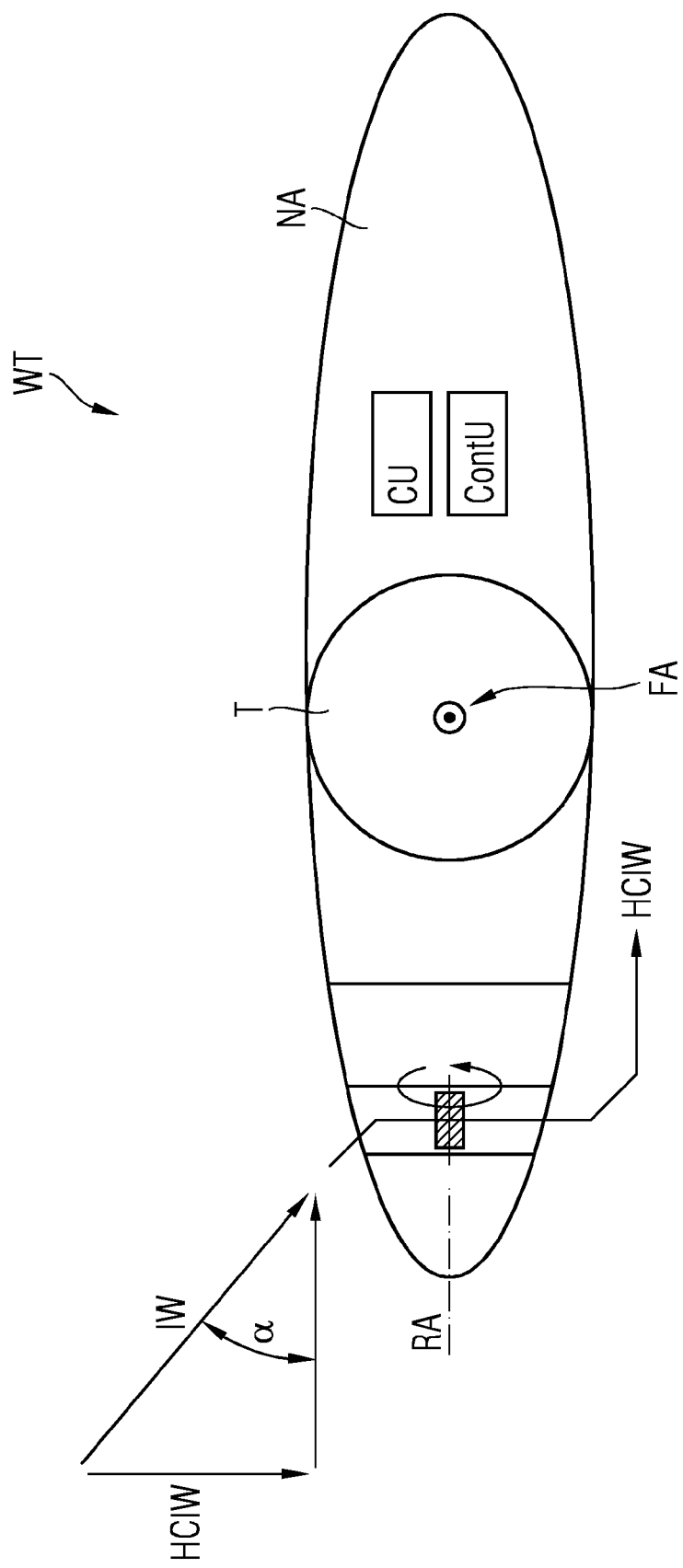
FIG. 4 shows the wind-turbine according to the invention when the yaw-angle-error shows certain value.

FIG. 4 shows the wind-turbine WT according to the invention when the yaw-angle-error a shows a certain value, in this case the angle is about 45° to the rotor-plane. So the rotor axis RA of the rotor R is not aligned to the direction of the incoming wind IW. The channel, which saturates the hub H, catches a horizontal component HCIW of the incoming wind IW. This component HCIW results therefore in a air-flow inside the channel, which is measured according to the invention.

Figure 5:
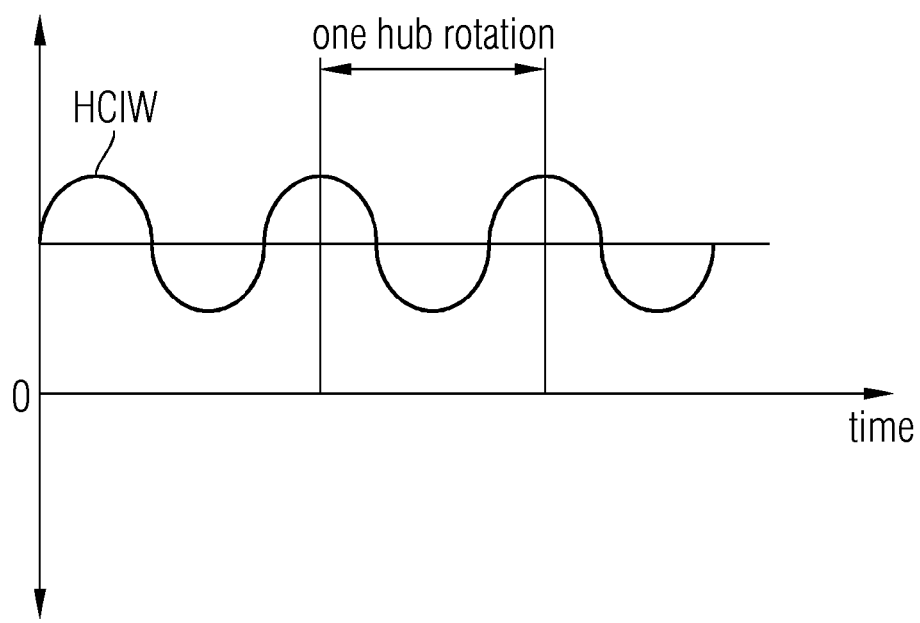
FIG. 5 shows referring to FIG. 4 the measured horizontal component of the wind, which is passing through the channel over time.

FIG. 5 shows referring to FIG. 4 the measured horizontal component HCIW of the air-flow inside the channel CH.

In this case the direction of the air-flow inside the channel CH will alternate between a first direction and a second direction. The alternation will more or less occur in a constant manner, showing nearly constant amplitudes of the alternating directions.

If the time-dependent shape of the measured component HCIW is integrated over time, a value greater than "0" will result. So the yaw-angle of the nacelle needs to be adjusted.

The invention claimed is:

1. A wind-turbine, comprising:
a nacelle, the nacelle being mounted rotatable around a first axis by an adjustable yaw angle;

a hub, the hub being connected to the nacelle and mounted rotatable around a rotational axis, wherein the hub comprises a blade rotating around the rotational axis due to an incoming wind, the rotating blade defining a rotor plane which is perpendicular to the rotational axis;

a channel passing through the hub, the channel comprising an opening, the opening being located at a predefined distance to the rotor plane and being arranged such that at least one component of the incoming wind is guided through the opening and into the channel as an air flow;

a measuring device arranged in the channel for measuring a parameter of the air flow while the air flow passes through the channel;

a controller connected to the measuring device, the controller using the measured parameter of the air flow to detect a yaw angle error between a direction of the incoming wind and the rotational axis, wherein the yaw angle error is used to adjust the yaw angle of the nacelle.

2. The wind turbine as claimed in claim 1, wherein the measuring device is part of the channel.

3. The wind turbine as claimed in claim 1, wherein at least one part of the channel is extending in a radial outward direction from the rotational axis, and wherein a longitudinal axis of the channel is substantially parallel to a longitudinal axis of the rotor blade.

4. The wind turbine as claimed in claim 1, wherein the measuring device measures a direction of the air flow.

5. The wind turbine as claimed in claim 1, wherein the measuring device measures a speed of the air flow.

6. The wind turbine as claimed in claim 1, wherein the measuring device measures an air pressure difference in the channel, the air pressure difference resulting from the air flow.

7. The wind turbine as claimed in claim 1, wherein the measuring device comprises an ultrasonic transducer to measure the parameter of the air flow.

8. The wind turbine as claimed in claim 1, wherein the measuring device comprises a propeller or a runner to measure the parameter of the air flow by a rotation of the propeller or runner when the air flow passes by.

9. The wind turbine as claimed in claim 1, wherein the opening of the channel is inclined relatively to the rotor plane to catch a component of the incoming wind which is not perpendicular to the rotor-plane.

10. The wind turbine as claimed in claim 1, wherein the channel passes through the hub, and/or wherein the channel shows openings on both sides of the hub with a predetermined distance to the rotational-axis or the rotor plane.

11. The wind turbine as claimed in claim 1, further comprising:
a calculation unit comparing the position of the rotating blades with the measurement of the measuring device to estimate the yaw angle error.

12. The wind turbine as claimed in claim 1, further comprising:
a control unit; and
a calculation unit analyzing the measurements over time to determine the yaw angle error, wherein the calculation unit is connected to the control unit, the control unit using an analysis of the measurements to control the yawing of the nacelle.

13. The wind turbine as claimed in claim 1, wherein a cross section of the channel and the opening of the channel is chosen such that deposition of salt, dirt or ice is avoided in the channel and at the opening.

14. The wind turbine as claimed in claim 1, wherein the opening of the channel is located at a predefined distance to the rotor-plane, and wherein the opening is arranged such that at least one component of the incoming wind is guided through the opening and into the channel as an air flow before the incoming wind passes the rotor plane.

15. A method of controlling yawing of a wind turbine according to claim 1, comprising:
guiding at least one component of the incoming wind as an air-flow through the opening and into the channel of the wind-turbine;
measuring a parameter of the air flow while the air flow passes through the channel;
detecting a yaw-angle-error between a direction of the incoming wind and the rotational axis based upon the measured parameter of the air flow; and
adjusting the yaw-angle of the nacelle according to the detected yaw angle error.

16. The method as claimed in claim 15, further comprising:
measuring inside the channel
a direction of the air flow, and/or
a speed of the air flow, and/or
an air pressure difference, the pressure difference resulting from the air flow, wherein the measuring is used as a parameter of the air flow.

17. The method as claimed in claim 15, further comprising:
comparing a position of the rotating blade with the measured parameter in order to estimate the yaw angle error by a calculation unit of the wind turbine.

18. The method as claimed in claim 15, further comprising:
integrating the measured parameter over time to determine the yaw angle error.

19. The method as claimed in claim 15, further comprising:
guiding the at least one component of the incoming wind as an air flow through the opening and into the channel of the wind turbine before the incoming wind passes the rotor plane.

20. A wind-turbine, comprising:
a nacelle, the nacelle being mounted rotatable around a first axis by an adjustable yaw angle;
a hub, the hub being connected to the nacelle and mounted rotatable around a rotational axis, wherein the hub comprises a blade rotating around the rotational axis due to an incoming wind, the rotating blade defining a rotor plane which is perpendicular to the rotational axis;
a channel passing through the hub, the channel comprising an opening, the opening being located at a predefined distance to the rotor plane and being arranged such that at least one component of the incoming wind is guided through the opening and into the channel as an air flow;
a measuring device arranged in the channel for measuring a parameter of the air flow while the air flow passes through the channel, wherein the measuring device comprises a valve, the valve showing at least two positions, wherein the positions of the valve are read by an encoder to detect the direction of the air flow in the channel; and
a controller connected to the measuring device, the controller using the measured parameter of the air flow to detect a yaw angle error between a direction of the incoming wind and the rotational axis, wherein the yaw angle error is used to adjust the yaw angle of the nacelle.

* * * * *